(12) United States Patent
Aboud et al.

(10) Patent No.: US 6,237,945 B1
(45) Date of Patent: May 29, 2001

(54) PASSENGER RESTRAINT SYSTEM

(75) Inventors: George Aboud, Northville; Jason P. Baldas, Warren, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/258,841

(22) Filed: Feb. 26, 1999

(51) Int. Cl.$^7$ ................................................. B60R 21/18
(52) U.S. Cl. ....................... 280/733; 280/808; 280/730.2; 297/484
(58) Field of Search .................. 280/733, 728.3, 280/730.1, 730.2, 808; 297/484, 216.13, 482; 119/771, 187, 792; 2/305, 310; 54/23

(56) References Cited

U.S. PATENT DOCUMENTS

| 3,682,498 | * | 8/1972 | Rutzki ................................... 280/733 |
| 3,866,940 | | 2/1975 | Lewis . |
| 3,883,053 | * | 5/1975 | Pritchard et al. .................... 280/733 |
| 3,905,615 | * | 9/1975 | Schulman .......................... 280/730.1 |
| 3,929,205 | * | 12/1975 | Takada et al. ....................... 280/733 |
| 3,948,541 | * | 4/1976 | Schulman ............................ 280/733 |
| 4,348,037 | * | 9/1982 | Law et al. ............................ 280/733 |
| 4,984,651 | | 1/1991 | Grösch et al. . |
| 5,062,662 | | 11/1991 | Cameron . |
| 5,108,152 | * | 4/1992 | Reilly et al. ......................... 297/482 |
| 5,282,648 | * | 2/1994 | Peterson ............................... 280/733 |
| 5,319,806 | * | 6/1994 | Hermann et al. ........................ 2/305 |
| 5,368,328 | | 11/1994 | Kamiyama et al. . |
| 5,393,091 | | 2/1995 | Tanaka et al. . |
| 5,466,002 | | 11/1995 | Tanaka et al. . |
| 5,486,037 | * | 1/1996 | Harper ................................. 297/397 |
| 5,503,894 | * | 4/1996 | Brown ..................................... 54/24 |
| 5,597,178 | | 1/1997 | Hardin, Jr. . |
| 5,642,902 | | 7/1997 | France . |
| 5,735,576 | * | 4/1998 | Pepys et al. ......................... 297/397 |
| 5,758,900 | | 6/1998 | Knoll et al. . |
| 5,839,753 | | 11/1998 | Yaniv et al. . |
| 5,851,055 | | 12/1998 | Lewis . |
| 5,913,536 | * | 6/1999 | Brown ............................... 280/730.2 |
| 6,010,150 | * | 1/2000 | Amann .............................. 280/730.2 |
| 6,059,311 | * | 5/2000 | Wipasuramonton et al. ..... 280/730.2 |
| 6,113,141 | * | 9/2000 | Baker ............................... 280/730.2 |

FOREIGN PATENT DOCUMENTS

| WO 97/06985 | 2/1997 | (WO) . |
| WO 97/43146 | 11/1997 | (WO) . |
| WO 97/47498 | 12/1997 | (WO) . |
| WO 98/00314 | 1/1998 | (WO) . |

* cited by examiner

Primary Examiner—Kenneth R. Rice
Assistant Examiner—Lynda Jasmin
(74) Attorney, Agent, or Firm—Brooks & Kushman P.C.

(57) ABSTRACT

A passenger restraint system for use with a vehicle having a seat includes an inflatable member fixed to the seat and having a guide channel. The passenger restraint system further includes a safety belt system having a torso section extending through the guide channel, wherein the torso section is moveable with respect to the inflatable member.

24 Claims, 4 Drawing Sheets

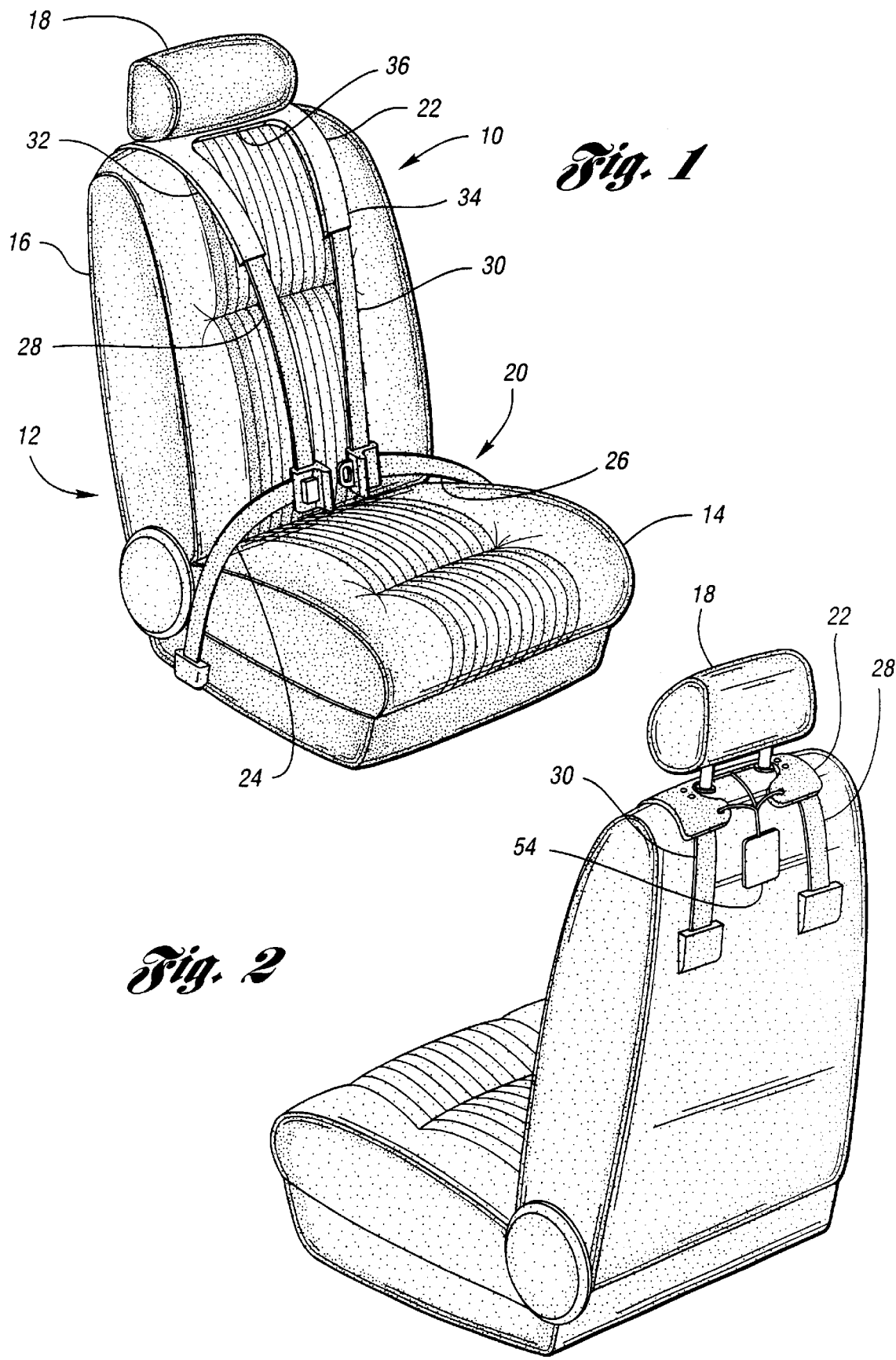

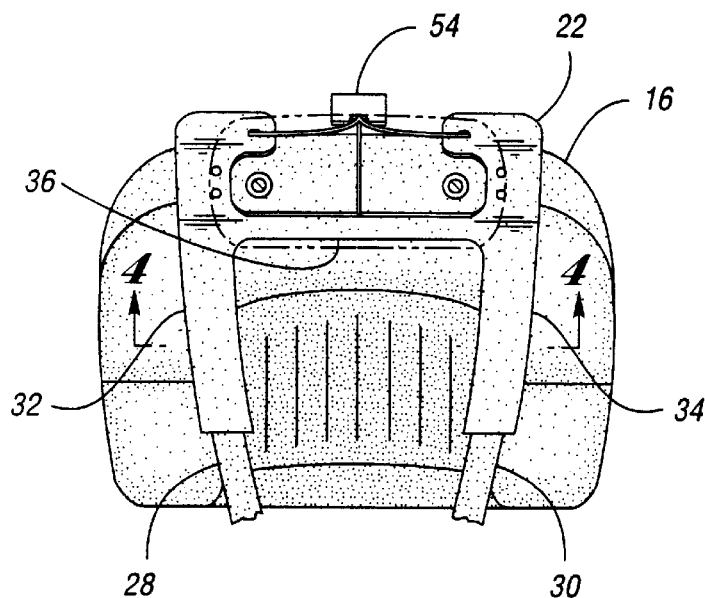
*Fig. 3*
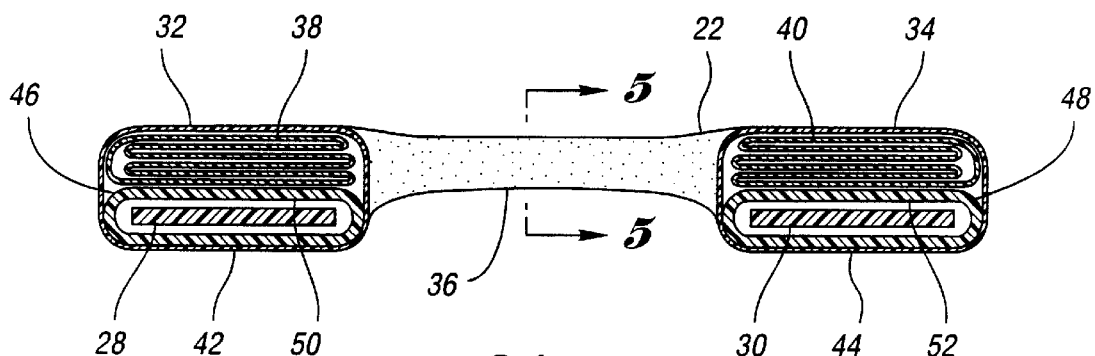
*Fig. 4*
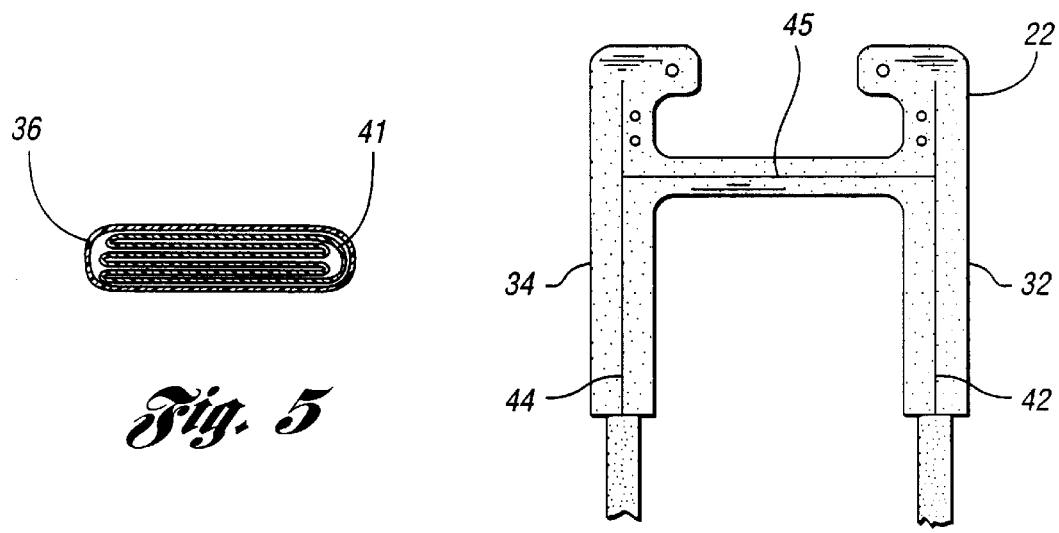
*Fig. 5*
*Fig. 6*

PASSENGER RESTRAINT SYSTEM

TECHNICAL FIELD

The invention relates to a passenger restraint system for use with a motor vehicle having a seat, wherein the passenger restraint system includes an inflatable member fixed to the seat.

BACKGROUND ART

U.S. Pat. No. 5,758,900 shows a protection system for a driver of a competition vehicle. The protection system includes a safety belt system having first and second shoulder belt parts, each of which is provided with one shoulder air bag attached thereto. Because the air bags are attached to the safety belt system, the safety belt system must be adjusted in order to adjust the position of the air bags relative to the driver. Furthermore, the safety belt system is relatively complex, and difficult to adjust. Consequently, such a protection system is not desirable for use in passenger vehicles.

U.S. Pat. No. 5,851,055 shows a passenger restraint system including a belt having a lap section, which may or may not be inflatable, and an inflatable torso section. The torso section has a first inflatable portion that contacts a passenger, and a second inflatable portion mounted in an enclosure that prevents substantial inflation of the second portion. The lengths of the first and second inflatable portions can also be varied so as to accommodate passengers of different sizes.

DISCLOSURE OF INVENTION

The present invention overcomes the shortcomings of the prior art by providing a passenger restraint system that includes an inflatable member fixed to a seat of a motor vehicle. Consequently, the passenger restraint system does not require difficult adjustment procedures in order to properly position the inflatable member relative to a passenger's head, neck and/or shoulders.

Accordingly, it is an object of the invention to provide a passenger restraint system including an inflatable member that is fixed to a seat of a motor vehicle.

Another object of the invention is to provide such a passenger restraint system including a safety belt system that is moveable along the length of a guide channel formed in the inflatable member.

Under the invention, a passenger restraint system, for use with a vehicle having a seat, includes an inflatable member fixed to the seat and having a guide channel. The passenger restraint system further includes a safety belt system having a torso section extending through the guide channel and being moveable with respect to the inflatable member.

Preferably, the inflatable member also functions as a belt-presenter for supporting a portion of the torso section of the safety belt system away from the seat.

In one embodiment of the invention, the inflatable member is fixed to an moveable headrest of the seat, and is moveable therewith. Advantageously, the inflatable member can be easily adjusted to accommodate passengers of varying sizes.

More specifically, a passenger restraint system according to the invention, for use with a vehicle having a seat, includes an inflatable collar fixed to the seat and having first and second guide channels. The passenger restraint system further includes a safety belt system having first and second torso sections extending through the first and second guide channels, respectively. The torso sections are also moveable with respect to the collar.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 1 is a perspective view of a passenger restraint system, according to the invention, mounted to a motor vehicle seat having a headrest, the passenger restraint system including a safety belt system and an inflatable collar;

FIG. 2 is a rear perspective view of the seat showing the safety belt system connected to the seat;

FIG. 3 is a top view of the inflatable collar and the seat, with the headrest removed from the seat;

FIG. 4 is a cross-sectional view of the inflatable collar taken along line 4—4 of FIG. 3, and showing first and second inflatable airbags;

FIG. 5 is a cross-sectional view of the inflatable collar taken along line 5—5 of FIG. 4, and showing a third inflatable airbag;

FIG. 6 is a bottom view of the inflatable collar;

BEST MODES FOR CARRYING OUT THE INVENTION

Figure 7:
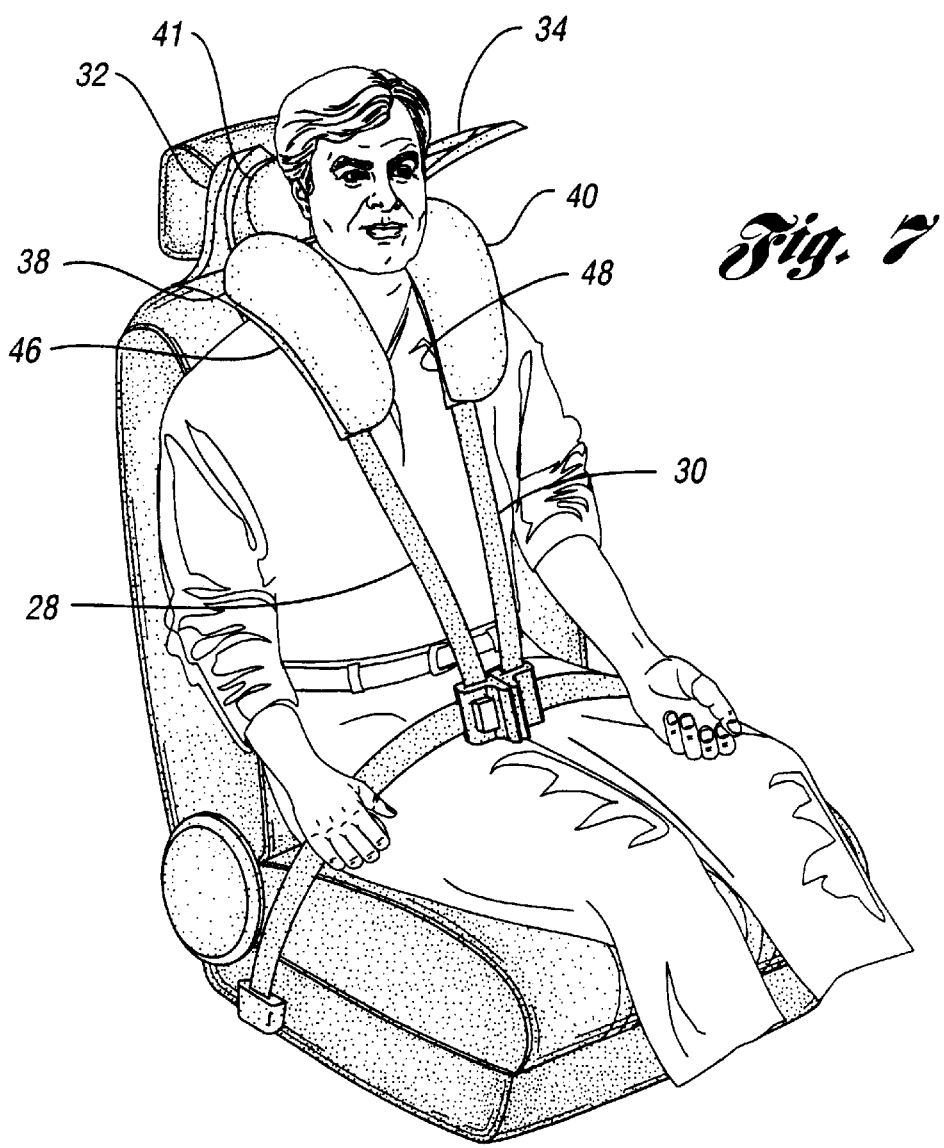
FIG. 7 is a perspective view of the passenger restraint system showing the airbags fully inflated.

FIG. 1 shows a passenger restraint system 10 according to the present invention for use in a motor vehicle, such as an automobile, train, airplane, or boat, having a seat 12, wherein the seat 12 has a lower portion 14, a seat back 16 and an adjustable headrest 18. The term passenger, as used in this application, means a driver or any other vehicle occupant. The passenger restraint system 10 includes a safety belt system 20 connected to the seat 12, and an inflatable member such as an inflatable collar 22. The safety belt system 20 has first and second lap sections 24 and 26, respectively, and first and second torso sections 28 and 30, respectively. The lap sections 24 and 26 are attached to suitable retracting devices (not shown), which are mounted to the lower portion 14 of the seat 12. The torso sections 28 and 30 extend along the rear of the seat back 16, as shown in FIG. 2, and are attached to suitable retracting devices (not shown), which are mounted to the lower portion 14 or the seat back 16. Such a configuration of the safety belt system 20 is referred to as a 4 point belt system.

The collar 22 is fixed to the seat back 16 in any suitable manner, such as with bolts, screws, or other fastening devices. Referring to FIG. 3, the collar 22 has first, second and third housing members or sleeves 32, 34 and 36, respectively. As shown in FIGS. 4 and 5, first, second and third inflatable airbags 38, 40 and 41, respectively, are disposed within the first, second and third sleeves 32, 34 and 36, respectively, when the airbags 38, 40 and 41 are not inflated. Furthermore, the airbags 38, 40 and 41 are fixed to the seat back 16. Alternatively, the third sleeve 36 and third airbag 41 may be eliminated if not required for a particular application. As another alternative, the airbags 38, 40 and 41 may be configured as a single airbag or multiple airbags.

As shown in FIG. 6, the first, second and third sleeves 32, 34 and 36, respectively, preferably have first, second and third frangible seams 42, 44 and 45, respectively, which rupture upon inflation of the airbags 38, 40 and 41. While the seams 42, 44 and 45 are shown on bottom surfaces of the sleeves 32, 34 and 36, the seams 32, 34 and 36 may be disposed along any suitable regions of the sleeves 32, 34 and 36, such as side and/or top surfaces. Alternatively, the sleeves 32, 34 and 36 may have any other suitable configuration such that the sleeves 32, 34 and 36 release the airbags 38, 40 and 41 when the airbags 38, 40 and 41 are inflated. The sleeves 32, 34 and 36 may be made of any suitable material, such as nylon, fabric, or leather.

Returning to FIG. 4, the collar 22 further has first and second belt guides 46 and 48, respectively, which define first and second guide channels 50 and 52, respectively, for receiving the first and second torso sections 28 and 30, respectively, of the safety belt system 20. The first and second torso sections 28 and 30, respectively, are freely moveable within the first and second guide channels 50 and 52, respectively, such that the collar 22 preferably does not support loads applied to the safety belt system 20. Furthermore, the first and second airbags 38 and 40, respectively, may be attached to the first and second belt guides 46 and 48, respectively, and the airbags 38 and 40 may be disposed above or below the belt guides 46 and 48.

The collar 22 is preferably configured such that it supports portions of the torso sections 28 and 30 of the safety belt system 20 away from the seat back 16. For example, the sleeves 32 and 34 and/or the belt guides 46 and 48 may be made of sufficiently rigid material such that the collar 22 extends away from the seat back 16. Thus, the collar 22 preferably functions as a belt-presenter.

The airbags 38, 40 and 41 are connected by suitable tubing to a gas source 54, shown in FIGS. 2 and 3, which is preferably mounted to the seat back 16. Alternatively, the gas source 54 may be located in the lower portion 14 of the seat 12, or in any other suitable location. While the gas source 54 may supply any suitable type of gas to the airbags 38, 40 and 41, the gas source 54 preferably supplies relatively cool gas, such as nitrogen or other inert gas, to the airbags 38, 40 and 41. The gas source 54 is connected to a diagnostic module (not shown), which controls activation of the gas source 54 and deployment of the airbags 38, 40 and 41. The diagnostic module also preferably controls operation of other airbags disposed in the vehicle.

FIG. 7 shows the airbags 38, 40 and 41 fully inflated. Each of the airbags 38, 40 and 41 has a predetermined, oblong shape when inflated, and the airbags 38, 40 and 41 provide protection for the head and neck of a passenger in side and rear impacts, as well as rollover events. As the airbags 38, 40 and 41 inflate, the seams 42, 44 and 45 rupture to release the airbags 38, 40 and 41 from the sleeves 32, 34 and 36. Furthermore, as the airbags 38 and 40 inflate, the airbags 38 and 40 pull or otherwise move the belt guides 46 and 48 upwardly, which in turn, pull the torso sections 28 and 30 of the safety belt system 20 snugly against the torso of the passenger. Consequently, the airbags 38 and 40 function as belt-pretensioners. Furthermore, because the torso sections 28 and 30 are pulled snugly against the torso of the passenger, belt-loads are distributed over a larger surface area of the passenger as compared with prior safety belt systems. Thus, point loads applied to the passenger are reduced with the passenger restraint system 10.

Figure 8:
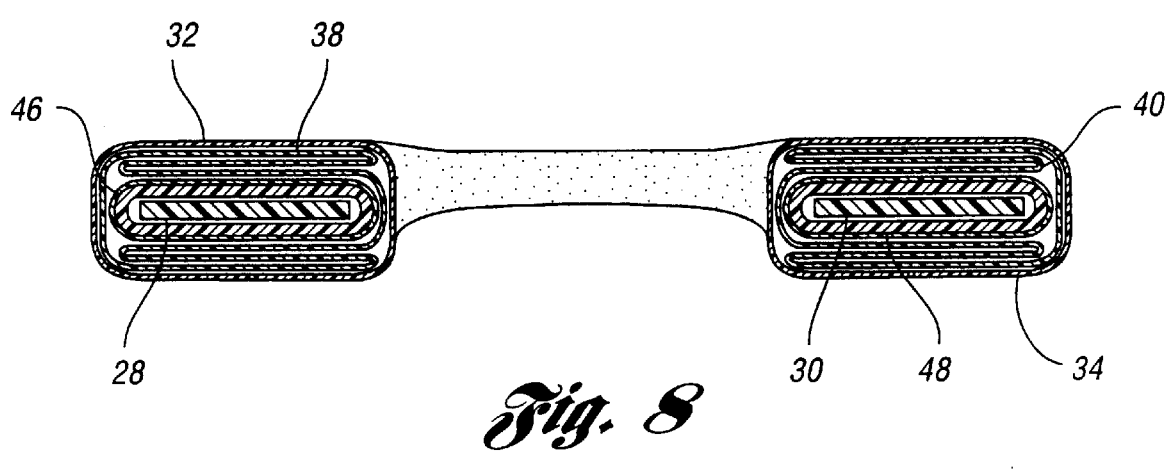
FIG. 8 is a cross-sectional view similar to FIG. 4 showing an alternative configuration for the first and second inflatable airbags.

FIG. 8 shows the airbags 38 and 40 with an alternative loop configuration, wherein the airbags 38 and 40 surround the belt guides 46 and 48 and the torso sections 28 and 30 of the safety belt system 20. With this configuration, the airbags 38 and 40 may be used to define guide channels for receiving the torso sections 28 and 30 of the safety belt system 20. As a result, the belt guides 46 and 48 may be reduced in length or eliminated if not necessary for a particular application. Furthermore, with this configuration, the airbags 38 and 40 have a tubular shape when inflated.

Figure 9:
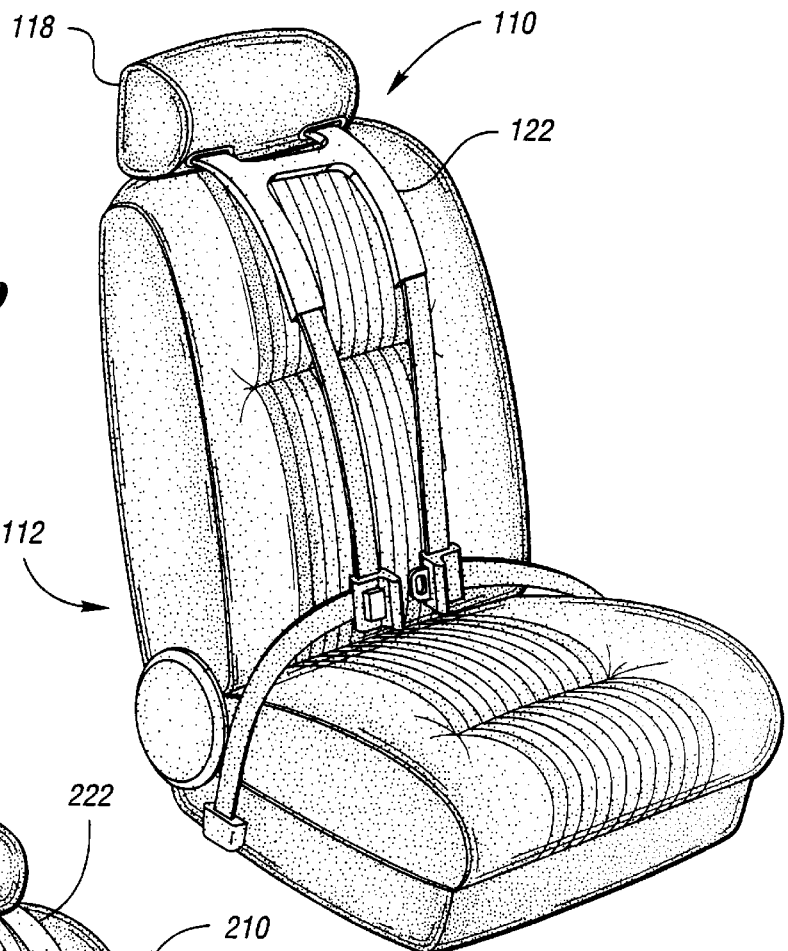
FIG. 9 is a perspective view of a second embodiment of the passenger restraint system.

FIG. 9 shows a second embodiment 110 of the passenger restraint system for use in a motor vehicle having a seat 112 with an automatically adjustable headrest 118. The passenger restraint system 110 includes an inflatable member such as an inflatable collar 122, as well as the other components of the passenger restraint system 10. The collar 122 is fixed to the headrest 118 in any suitable manner, such as with bolts, screws, or other fasteners, and functions in a manner similar to the collar 22. Advantageously, the collar 122 is adjustable with the headrest 118 so as to easily accommodate passengers of different sizes.

Figure 10:
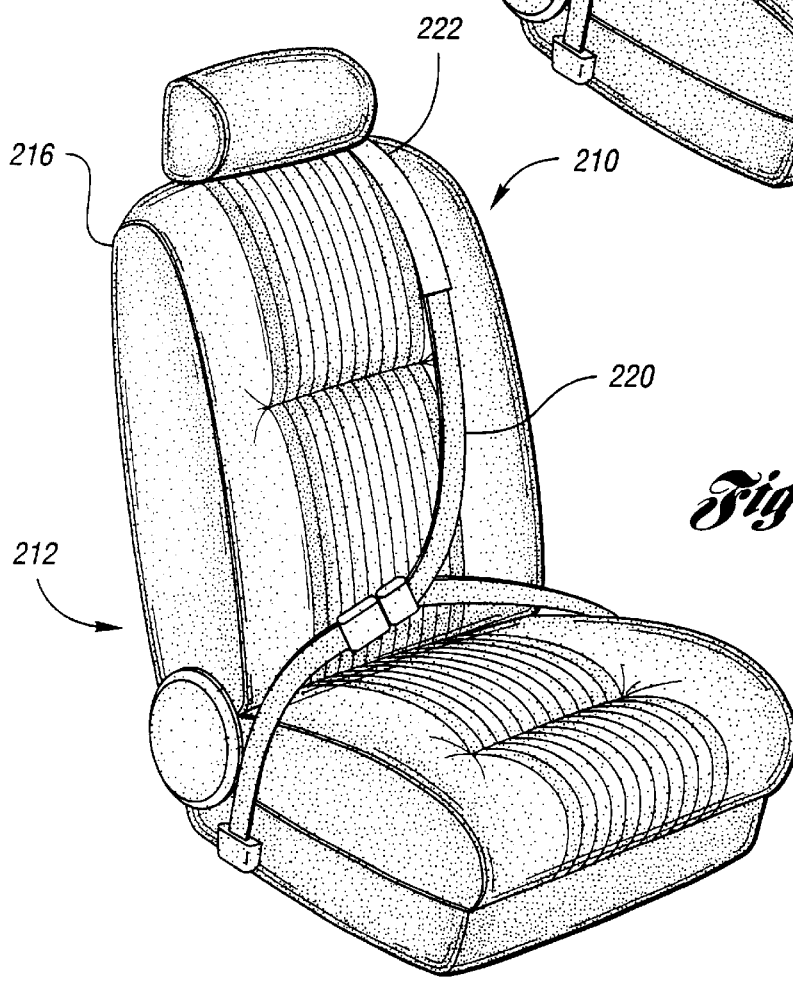
FIG. 10 is a perspective view of a third embodiment of the passenger restraint system.

FIG. 10 shows a third embodiment 210 of the passenger restraint system for use in a vehicle having a seat 212 with a seat back 216, wherein the passenger restraint system 210 includes a 3 point safety belt system 220, and an inflatable member 222 fixed to the seat back 216. The inflatable member 222 functions in a manner similar to the collar 22, except that the inflatable member 222 only has one airbag.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A passenger restraint system and vehicle seat combination comprising:
   a seat;
   an inflatable collar fixed to the seat and having a channel; and
   a safety belt system having a torso section extending through the channel, wherein the torso section is moveable with respect to the inflatable collar.

2. The combination of claim 1 wherein the inflatable collar is sufficiently rigid so as to function as a belt-presenter for supporting a portion of the torso section of the safety belt system away from the seat without the inflatable collar being inflated.

3. The combination of claim 1 wherein the inflatable collar comprises a housing and an inflatable airbag disposed within the housing when the airbag is not inflated, wherein the housing is configured to release the airbag therefrom when the airbag is inflated.

4. The combination of claim 3 wherein the inflatable collar further comprises a belt guide that defines the channel, and the airbag is attached to the belt guide, wherein when the airbag is inflated, the belt guide tenses the torso section of the safety belt system.

5. The combination of claim 1 wherein the seat has a moveable headrest, and the inflatable collar is fixed to the headrest and moveable therewith.

6. The combination of claim 1 wherein the inflatable collar has an inflatable portion that extends along the back of a neck of a passenger when inflated.

7. A passenger restraint system and vehicle seat combination comprising:

a seat;

an inflatable collar fixed to the seat and having first and second guide channels; and a safety belt system having first and second torso sections extending through the first and second guide channels, respectively, the torso sections being moveable with respect to the collar.

8. The combination of claim 7 wherein the inflatable collar is configured to support a portion of at least one of the torso sections of the safety belt system away from the seat.

9. The combination of claim 7 wherein the inflatable collar comprises first and second sleeves, respectively, and first and second inflatable airbags disposed within the first and second sleeves, respectively, when the airbags are not inflated, wherein the sleeves are configured to release the airbags therefrom when the airbags are inflated.

10. The combination of claim 9 wherein the inflatable collar further comprises a third sleeve disposed between the first and second sleeves, and a third airbag disposed in the third sleeve when not inflated, wherein the third sleeve is configured to release the third airbag therefrom when the third airbag is inflated such that the third airbag extends along the back of a neck of a passenger when inflated.

11. The combination of claim 7 wherein the inflatable collar is configured to tense the torso sections of the safety belt system when the inflatable collar is inflated.

12. The combination of claim 7 wherein the seat has a moveable headrest, and the inflatable collar is fixed to the headrest and moveable therewith.

13. The combination of claim 7 wherein the inflatable collar has an inflatable portion that extends along the back of a neck of a passenger when inflated.

14. A motor vehicle comprising:

a seat;

an inflatable collar fixed to the seat and having a guide channel; and a safety belt system having a torso section extending through the guide channel, wherein the torso section is moveable with respect to the inflatable collar.

15. A passenger restraint system and vehicle seat combination comprising:

a seat;

an inflatable member fixed to the seat and having a channel; and a safety belt system having a torso section extending through the channel, the torso section being moveable with respect to the inflatable member;

wherein the inflatable member is sufficiently rigid so as to function as a belt-presenter for supporting a portion of the torso section of the safety belt system away from the seat without the inflatable member being inflated.

16. The combination of claim 15 wherein the inflatable member comprises a housing and an inflatable airbag disposed within the housing when the airbag is not inflated, wherein the housing is configured to release the airbag therefrom when the airbag is inflated.

17. The combination of claim 16 wherein the inflatable member further comprises a belt guide that defines the channel, and the airbag is attached to the belt guide, wherein when the airbag is inflated, the belt guide tenses the torso section of the safety belt system.

18. The combination of claim 15 wherein the seat has a moveable headrest, and the inflatable member is fixed to the headrest and moveable therewith.

19. The combination of claim 15 wherein the inflatable member comprises an inflatable collar having an inflatable portion that is adapted to extend along the back of a neck of a passenger when inflated.

20. A passenger restraint system and vehicle seat combination comprising:

a seat having a moveable headrest;

an inflatable member fixed to the headrest and moveable therewith, the inflatable member having a channel; and a safety belt system having a torso section extending through the channel, wherein the torso section is moveable with respect to the inflatable member.

21. The combination of claim 20 wherein the inflatable member is sufficiently rigid so as to function as a belt-presenter for supporting a portion of the torso section of the safety belt system away from the seat without the inflatable member being inflated.

22. The combination of claim 20 wherein the inflatable member comprises a housing and an inflatable airbag disposed within the housing when the airbag is not inflated, wherein the housing is configured to release the airbag therefrom when the airbag is inflated.

23. The combination of claim 22 wherein the inflatable member further comprises a belt guide that defines the channel, and the airbag is attached to the belt guide, wherein when the airbag is inflated, the belt guide tenses the torso section of the safety belt system.

24. The combination of claim 20 wherein the inflatable member comprises an inflatable collar having an inflatable portion that is adapted to extend along the back of a neck of a passenger when inflated.

* * * * *